Dec. 16, 1930.  A. L. DUNCAN  1,785,008
METHOD AND APPARATUS FOR CLEARING FRUIT PITTING MACHINES
Original Filed July 30, 1927
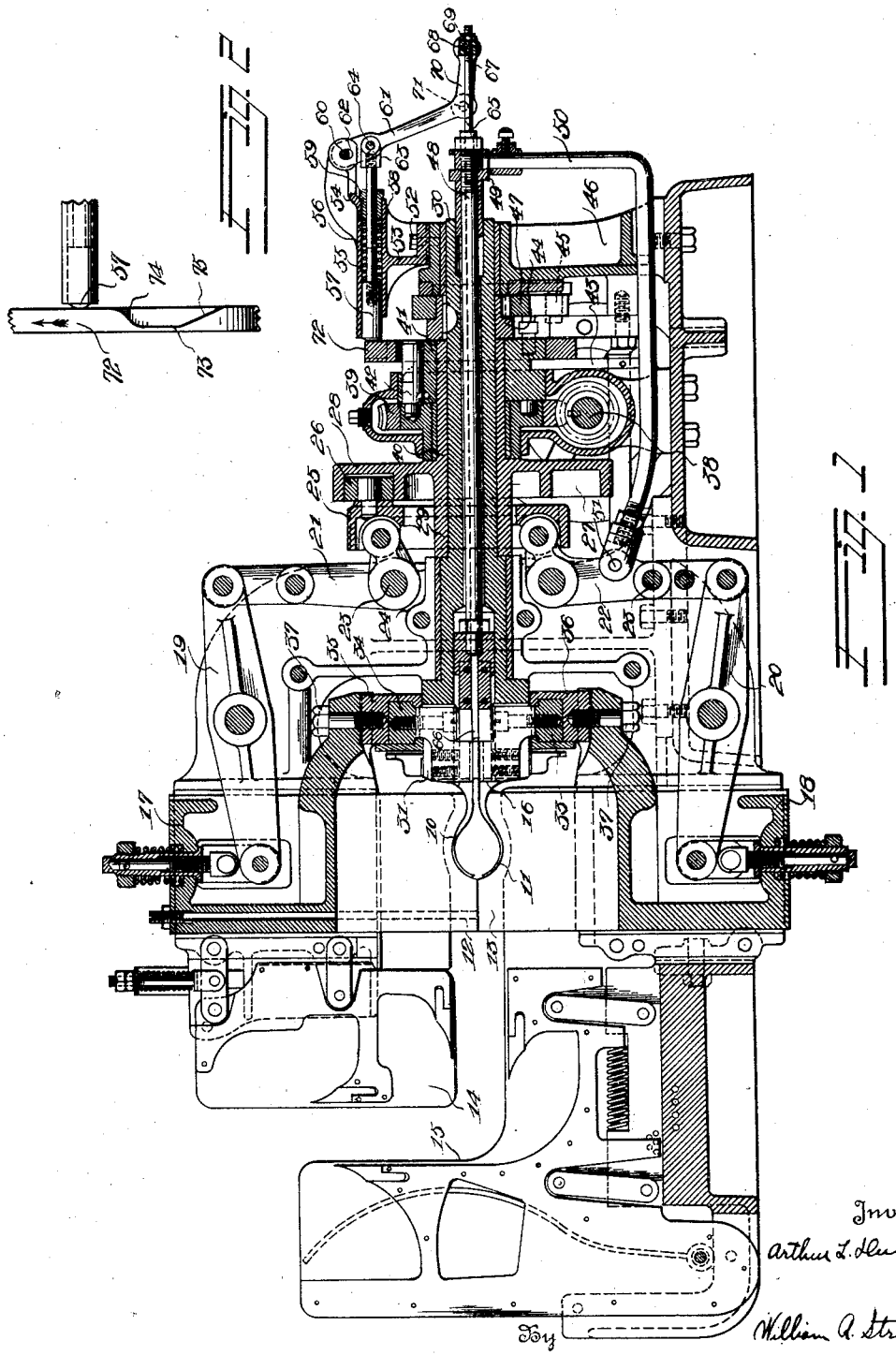
Inventor
Arthur L. Duncan
By William A. Strauch
Attorney Patented Dec. 16, 1930

1,785,008

UNITED STATES PATENT OFFICE

ARTHUR L. DUNCAN, OF PIEDMONT, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

METHOD AND APPARATUS FOR CLEARING FRUIT-PITTING MACHINES

Application filed July 30, 1927, Serial No. 209,488. Renewed May 20, 1930.

This invention relates to methods and machines for pitting peaches or similar fruit in which the edges of the pit are exposed by a cleft groove or recess to provide access to the pit and to enable a curved pitting knife or knives to be brought into substantial contact with said edges. In machines of this type holding means of various kinds are provided to facilitate the operation of the pitting knives. After the operation of the pitting knives completing the severing of the peach halves from the pit, the halves and the pit sometimes adhere to the holders, or the pit may remain between the knives, though said holders and knives are themselves movable. Accordingly the machine does not always clear itself of the fruit parts after each operation, and it is essential to rapid operation that some means be provided to positively eject the pit and the halves after each operation. Air under pressure has been successfully used for this purpose, but in large canneries using many machines, the use of air requires the installation of large, and consequently expensive, air compressors.

A primary object of this invention is to provide a unitary mechanical mechanism to eject the pit and the pit halves timed to perform its function immediately after the severance of the halves from the pit has been concluded.

A further object of the invention is to provide a method for clearing a peach pitting machine in which the ejection of the fruit halves is effected by ejection of the pit, the pit or core in which the pit is embedded serving to wedge the halves apart to cause their separation from each other and the parts of the machine with which they contact.

A further object of the invention is to provide a machine embodying an ejecting mechanism actuated by a spring, that is normally held under compression and released at properly timed intervals to engage the pit with a comparatively sharp yielding blow.

Further objects of the invention will appear as a description thereof proceeds with reference to the accompanying drawing in which—

Figure 1 is a longitudinal sectional view of the improved peach pitting machine.

Figure 2 is a development of the cam that controls the movement of the ejector.

Like reference characters indicate like parts throughout the several figures.

The invention is shown as applied to the peach pitting machine described in copending application Serial No. 191,334, filed May 14, 1927. As described in detail in said application, the machine comprises a pair of curved pitting knives 10 and 11, a pair of holding jaws 12 and 13, and spaced blades 14 and 15 providing a path between them for the pit of the peach. Blades 14 and 15 form a circumferential recess in the flesh of the fruit surrounding the sharp edge of the pit, and guide the fruit into position between the jaws 12 and 13 and the knives 10 and 11 that are normally open to receive the pit. A retractable gauge 16 determines the extent of movement of the pit and stops it in proper position between the pitting knives.

The jaws 12 and 13 and the knives 10 and 11 are carried in slides 17 and 18 that are reciprocated toward and from each other by levers 19 and 20 that are connected to the slides at one end and linked at their other ends to one arm of bell crank levers 21 and 22 pivoted at 23 to the frame 24 of the machine. The other arms of levers 21 and 22 are linked together by a member 25 for unitary movement. Member 25 has a cam roller 26 secured thereto that rides in a cam groove 27 of a cam 28 carried by a sleeve 29 that rotatably surrounds the main shaft 30 of the machine. The cam groove is formed so that the jaws and knives are opened and closed to embrace and center the pit at proper intervals.

Knives 10 and 11 are, however, rotatable bodily with respect to the jaws 12 and 13. To effect their rotation at the proper time the heads of said knives are set in furcations 31 of main shaft 30, said heads being slidable in said furcations to permit their movement with jaws 12 and 13. The heads 31 of said knives are connected to the slides 17 and 18 by projections 33 and 34, that slide in curved guides 35 and 36 bolted to said slides by bolts 37. Said guides may be circular or oval, as may be desired, to determine the course of bodily movement of the pitting knives through the flesh of the fruit.

The parts just described receive their motion from a worm 38 that may be power driven in any suitable manner. Worm 38 meshes with worm wheel 39 rotatably mounted on an extension 40 from sleeve 29. A sleeve 41 surrounds sleeve 40 and is keyed thereto. A sliding pin 42 clutches worm wheel 39 and sleeve 41 together for rotation through one revolution, the pin 42 being released from sleeve 41 by a tripping member 43 that retracts the pin after each revolution. Sleeve 41 carries a pawl (not shown) that engages a tooth on a sleeve 44 after sleeve 41 and sleeve 29 secured thereto have been rotated through a portion of a revolution to close the knives 10 and 11 and the jaws 12 and 13 about the pit. Sleeve 44 is keyed to the main shaft 30 for rotation therewith. A locking dog 45 carried by an upward extension 46 of frame 24 engages, at intervals, a tooth on a collar 47 keyed to sleeve 44 to hold the knives 10 and 11 in proper position at the completion of each operation.

Gauge 16 is retracted as the jaws 12 and 13 and the knives 10 and 11 are moved toward each other to close about the peach pit, by means of a tube 48 that is arranged in a longitudinal bore in the main shaft 30. Gauge 16 is secured at one end to tube 48. At the other end of said tube an actuating bracket 49 engages the yoke end of a bent lever 50 that is pivotally attached at 51 to bell crank 22, so that the movements of the gauge will be properly timed with respect to the movements of the jaw 13, itself controlled by the bell crank 22.

So far as described, the machine is identical to that fully described in application Serial No. 191,334 above referred to, and reference may be had to said application for a detailed description of the parts that are above described generally. The invention of this application resides in the addition to a machine of the type above generally described of an improved mechanical ejector presently to be described.

Bolted to upright extension 46 of frame 24 of the machine as by cap screw 52 is a bracket 53 having an overhanging arm 54. Said bracket 53 is provided with a longitudinal bore 55, open at both ends. Arranged in said bore is a rod 56 having an enlarged head 57 slidable in bore 55. Surrounding rod 56 and abutting against the head 57 is a coil spring 58. A sleeve 59 surrounds rod 56 and abuts against the other end of spring 58. Sleeve 59 is suitably secured in bore 55, the arrangement being such that the spring 58 is under compression.

Pivoted to ears on arm 54 by means of a pin 60 is an arm 61 that is provided with an elongated slot 62 through which said pin passes. Rod 56 is attached to arm 61 by a bracket 63 and a pivot pin 64.

An ejector rod 65 passes centrally through a longitudinal bore in gauge operating tube 48, and the forward end 66 thereof is arranged to project between the knives 10 and 11 and jaws 12 and 13 when said knives and jaws are separated after the completion of a pitting operation. The rear end of said rod is threaded at 67 to engage a member 68 that is pivoted at 69 to one end of a link 70. Link 70 is pivoted at 71 to the free end of arm 61.

It will be observed that the spring 58, being under compression, tends to move the arm 61 clockwise and said arm through link 70 tends to project the forward end 66 of the ejector rod toward its ejecting position between the jaws and knives. In order to control the movement of said rod under the influence of said spring a collar 72 is keyed or otherwise secured to sleeve 41 that rotates as a unit with cam 28 that controls the reciprocatory movement of the knives and jaws. Said collar is arranged in the path of head 57 and is provided with a depression at one point constituting a cam surface 73 (see Figure 2). One side of said depression is formed by a comparatively abrupt shoulder 74, the other side being formed by a gradual inclination 75 extending from the bottom of said depression. The sleeve moves in the direction of the arrow shown in Figure 2. Accordingly, when the head 57 reaches the depression 73 spring 58 will cause said head to enter the depression thus permitting rod 56 to swing arm 61 and project end 66 of rod 65 forwardly into operative position. Because of the abruptness of shoulder 74 spring 58 will cause the rod to move quickly to the bottom of the depression, causing a snap action of the ejector. As the inclined surface 75 engages head 57 the spring 58 is again compressed and the ejector rod is withdrawn to a position from which it is caused to spring forward when the depression in sleeve 72 again comes opposite said head.

In operation, knives 10 and 11 and jaws 12 and 13 are normally separated, while gauge 16 is forwardly disposed, and the ejector 65 is in its rearward position. A peach is fed between the blades 14 and 15, so that it will be cut by said blades in the plane indicated by the external crease, and the peach is first moved vertically to the end of the vertical branch of the path provided for it when it is moved horizontally completing substantially a groove around the pit. The horizontal movement of the peach is continued until the edge of the pit is engaged by gauge 16. It is then in position for the pitting operation. The operator then actuates the one revolution clutch that permits the pin 42 to clutch worm 39 to sleeve 41, the latter sleeve operating sleeve 29 and cam 28 carried thereby. Cam 28 actuates bell crank levers 21 and 22 that simultaneously swing levers 19 and 20 about their pivots and bell crank lever 22 through link 50 actuates gauge operating tube 48. The gauge is thus withdrawn to the position shown in the drawings, while at the same time the levers 19 and 20 cause the knives 10 and 11 and the jaws 12 and 13 to close about the pit.

During this time main shaft 30 was not in operation. After completion of the above sequence of operations the pawl on sleeve 41 engages a tooth on sleeve 44 of main shaft rotating said shaft and the knives 10 and 11 carried thereby through a half revolution, thus severing the halves of the fruit from the pit, the cam plates 35 determining the orbital path of the knives. During this operation cam 28 maintained the relative positions of the jaws and knives unchanged. Upon completion of the cutting of the halves from the pit, pawl 45 on frame extension 46 engages a tooth on sleeve 47 fixed to the main shaft, holding the shaft in proper position. The movement of sleeve 41 and cam 28 continues, said cam being formed to then separate the jaws and pitting knives. Just before the completion of the separational movement of the jaws and knives, depression 73 permits rod 56 under the action of spring 58, to actuate the ejector rod 65, the end 66 of which springs into the space between the partially separated knives, said end engaging the pit and moving it endwise of the knives. If the halves are adhering to the jaws the endwise movement of the pit wedges said halves apart separating them from each other and the jaws, and causing the pit and halves to be cleared from the machine before the next operation. After the ejecting operation inclined surface 75 on collar 72 restores the ejector to the position shown in Figure 1. The single revolution is then completed and the one revolution clutch automatically stops the machine with the parts in position for a repetition of the operation above described.

The invention may be embodied in other forms without departing from the spirit or essential characteristics thereof, and the present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A fruit pitting machine of the type that cuts the fruit halves from the substantially intact pit including an ejector reciprocably mounted to move along a line substantially parallel to an axis of the pit in the plane of its suture, and means to reciprocate said ejector to cause it to move the pit along said axis so that the pit will wedge apart and eject the free halves from the machine.

2. A fruit pitting machine of the type that cuts the fruit halves from the substantially intact pit including an ejector, means biasing said ejector toward its ejecting position, and means to hold said ejector withdrawn while the halves are being cut from the pit and to permit it to spring into operative position under the action of said biasing means after the completion of the separation of the halves and pit.

3. A fruit pitting machine of the type that cuts the fruit halves from the substantially intact pit including an ejector reciprocably mounted to move along a line substantially parallel to an axis of the pit in the plane of its suture, means biasing said ejector yieldingly towards its ejecting position, and means to hold said ejector withdrawn while the halves are being cut from the pit and to permit it to reciprocate with a snap action toward its operative position under the action of said biasing means after the separation of the halves and pit.

4. A peach pitting machine of the type that cuts the substantially intact pit from the halves by the rotation of a pair of pitting knives about an axis that approximates the major axis of the pit in the plane of its suture including a reciprocably mounted ejector arranged to move in a line parallel to said axis, yielding means to contantly urge said ejector toward its operative position, means to release said yielding means at predetermined intervals and means to withdraw said ejector after each operation.

5. The combination defined in claim 4 in which the yielding means is a spring under compression.

6. A peach pitting machine of the type that cuts the pit from a peach by entering separable knives and holding jaws designed to enter a circumferential groove in the plane of the suture of the pit including an ejector rod, and means to project said rod forwardly when the pit and halves are separated and when said knives and jaws are open to engage the pit and cause it to move toward said circumferential groove whereby the pit will wedge apart the halves and separate them from said jaws and knives.

7. A peach pitting machine comprising a pair of diametrically opposite curved pitting knives, means to form a circumferential halving groove in the peah to receive said knives, means to hold the fruit during the operation of said pitting knives, means to rotate said knives, means to separate the knives after completion of the cutting operation, an ejector reciprocably mounted for movement in a plane passing through said groove, and means to hold said ejector retracted during the operation of said knives and to advance it after the knives are separated to eject the pit and separate the halves therefrom by the wedging action caused by the pit movement toward said groove.

8. The combination defined in claim 7 in which the ejector is urged toward its operative position by a spring under compression and including means to automatically compress said spring after each operation of said ejector.

9. A peach pitting machine including a hollow rotatable shaft, a pair of diametrically opposite curved pitting knives arranged to embrace the pit of a peach in the plane of the suture of the pit secured to said shaft so that they may be moved bodily toward and away from the shaft axis, an ejector arranged in said shaft, means to rotate said knife, means to separate said knives, yielding means urging said ejector toward said knives and means to release said ejector to permit it to spring forward when said knives are separated.

10. A peach pitting machine including a revoluble hollow shaft, a pair of diametrically opposed pitting knives on said shaft, said knives being slidable toward each other, an ejector rod movable axially of said shaft, an arm linked to said ejector at one end, a spring pressed rod connected to said arm and tending to move said ejector toward its operative position, and means to hold said rod retracted except at predetermined intervals.

11. The combination defined in claim 10 in which said last named means is a cam having a depression, one wall of which is relatively sharply inclined and the other wall of which is gradually inclined.

12. The method of clearing a peach pitting machine of pits and peach halves that have been separated from the pits which comprises moving the pit toward the halving cut to wedge apart the free halves.

13. The method of clearing a peach pitting machine of pits and peach halves that have been separated which consists in striking a relatively sharp blow against the pit substantially at the suture thereof to cause said pit to wedge apart the free halves and to be itself removed by said blow.

14. The method of clearing a peach pitting machine of the type that embodies jaws to enter a circumferential recess in the peach in the plane of the pit suture and knives to cut the halves from the pit by cuts that begin and end in said recess, which consists in subjecting the pit to a relatively sharp blow delivered substantially through said recess to cause the pit to move and wedge apart the halves and be itself ejected by said blow.

15. In a fruit pitting mechanism, the combination with a pair of rotatable pitting knives arranged to be rotated within a piece of fruit to sever the pit from within the fruit, of a pit remover arranged to be operated in timed relation to the operation of the knives to dislodge the severed pit from the knives.

In testimony whereof I affix my signature.

ARTHUR L. DUNCAN.